(12) United States Patent
Lester et al.

(10) Patent No.: US 10,546,012 B2
(45) Date of Patent: Jan. 28, 2020

(54) SYNONYM EXPANSION

(71) Applicant: SHUTTERSTOCK, INC., New York, NY (US)

(72) Inventors: Kevin Lester, Summit, NJ (US); Heath Walter Hohwald, Logrono (ES)

(73) Assignee: Shutterstock, Inc., New York, NY (US)

( * ) Notice: Subject to any disclaimer, the term of this patent is extended or adjusted under 35 U.S.C. 154(b) by 728 days.

(21) Appl. No.: 14/750,607

(22) Filed: Jun. 25, 2015

(65) Prior Publication Data

US 2015/0379081 A1  Dec. 31, 2015

Related U.S. Application Data

(60) Provisional application No. 62/017,987, filed on Jun. 27, 2014.

(51) Int. Cl.
*G06F 16/48* (2019.01)
*G06F 16/33* (2019.01)

(52) U.S. Cl.
CPC .......... *G06F 16/48* (2019.01); *G06F 16/3338* (2019.01)

(58) Field of Classification Search
CPC .......... G06F 17/30672; G06F 16/3338; G06F 16/2795
See application file for complete search history.

(56) References Cited

U.S. PATENT DOCUMENTS

| 7,636,714 | B1* | 12/2009 | Lamping | G06F 17/30672 |
| 8,055,669 | B1* | 11/2011 | Singhal | G06F 17/3064 |
| | | | | 707/765 |
| 8,548,981 | B1* | 10/2013 | Bhattacharjee | G06F 16/3322 |
| | | | | 707/713 |
| 2007/0027857 | A1* | 2/2007 | Deng | G06F 17/30038 |
| 2007/0288448 | A1* | 12/2007 | Datta | G06F 17/2795 |
| 2012/0290577 | A1* | 11/2012 | Cai | G06K 9/4671 |
| | | | | 707/737 |

* cited by examiner

*Primary Examiner* — Charles E Lu
(74) *Attorney, Agent, or Firm* — McDermott Will & Emery LLP (57) ABSTRACT

Techniques for synonym expansion are provided. An example method includes retrieving one or more multimedia items and one or more keywords associated with the multimedia items, wherein the retrieving is performed for the one or more multimedia items that are associated with both a query term and a synonym from a synonym pair, determining a first set of one or more keywords that are common to a group of multimedia items obtained based on the retrieving, determining, for each keyword from the first set of one or more keywords, a context score quantifying a value of the keyword for the synonym pair, based on the context score, determining from the first set of one or more keywords a second set of keywords that correlate higher to the synonym pair relative to other keywords from the second set of one or more keywords.

12 Claims, 4 Drawing Sheets

| Original Term | Candidate Synonym | Positive Context Term Table | Negative Context Term Table |
|---|---|---|---|
| old | antique | furniture: 200, clock: 50 | |
| old | elderly | senior:100, mature: 80, person: 50 | |
| shop | store | location:10, candy: 5 | lifting: 20 |

SYNONYM EXPANSION

CROSS REFERENCE TO RELATED APPLICATIONS

The present application is a non-provisional of U.S. Patent Application Ser. No. 62/017,987 entitled "Synonym Expansion," filed on Jun. 27, 2014, the disclosure of which is hereby incorporated by reference in its entirety for all purposes.

BACKGROUND

The present disclosure relates generally to information retrieval.

SUMMARY

The disclosed subject matter relates to synonym expansion in information retrieval.

In some innovative implementations, the disclosed subject matter can be embodied in a method. The method includes retrieving one or more multimedia items and one or more keywords associated with the multimedia items, where the retrieving is performed for the one or more multimedia items that are associated with both a query term and a synonym from a synonym pair. In some implementations, the multimedia item may not be associated with both the query term and the synonym but potentially just one of them. The method also includes determining a first set of one or more keywords that are common to a group of multimedia items obtained based on the retrieving, computing for each keyword, a total number of multimedia items in the group that include the keyword and determining based on the computed total number, for each keyword from the first set of one or more keywords, a context score quantifying a value of the keyword for the synonym pair. The method further includes, based on the context score and the computed total, determining from the first set of one or more keywords a second set of keywords that correlate higher to the synonym pair relative to other keywords from the second set of one or more keywords, and using the second set of keywords as context for the query term and the synonym pair.

In some innovative implementations, the disclosed subject matter can be embodied in a machine readable medium. The machine readable medium includes instructions, which when executed by a processor, cause the processor to perform operations comprising resolving a query into one or more terms, analyzing each of the one or more terms within a context of the query to determine whether the one or more terms are to be expanded using one or more synonyms, retrieving one or more candidate synonyms and associated context data for each term in the query, scoring each candidate synonym, and based on the scoring, selecting a particular candidate synonym for expansion of the query.

In some innovative implementations, the disclosed subject matter can be embodied in a system. The system includes a memory comprising instructions and a processor configured to execute the instructions to retrieve one or more multimedia items and one or more keywords associated with the multimedia items, where the retrieving is performed for the one or more multimedia items that are associated with both a query term and a synonym from a synonym pair. The processor is also configured to execute the instructions to determine a first set of one or more keywords that are common to a group of multimedia items obtained based on the retrieving, compute for each keyword, a total number of multimedia items in the group that include the keyword and determine based on the computed total number, for each keyword from the first set of one or more keywords, a context score quantifying a value of the keyword for the synonym pair. The processor is further configured to execute, based on the context score and the computed total, the instructions to determine from the first set of one or more keywords a second set of keywords that correlate higher to the synonym pair relative to other keywords from the second set of one or more keywords, and use the second set of keywords as context for the query term and the synonym pair.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the accompanying figures summarized below.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The subject technology is not limited to the specific details set forth herein and may be practiced without these specific details.

In a typical information retrieval (IR) system, it can be common for multimedia items to be ranked according to keywords (along with many other factors). The keywords that are determined to be most relevant for a multimedia document may typically be assigned a higher weight than the other keywords. When a user performs a search, the system matches a user's search terms with the weighted keywords to determine the multimedia items that are most relevant to a user's query.

The terms multimedia document and/or multimedia item may be, for example, considered to be a digital document that is composed of one or multiple media elements of different types (text, image, video, etc.) as a logically coherent unit. A multimedia document can be a single picture or a single MPEG video file. Often it is a complicated document such as a Web page consisting of both text and images.

One challenge with this approach is that often users may search for a multimedia item using terms that do not exactly match a multimedia item's keywords. In some cases, a user may perform a search using a synonym of one of the keywords which may not directly match the keywords associated with the multimedia item. In this case, the multimedia item may not be returned in the search result, even though it may be the most relevant multimedia item for the search. For example, the keyword metadata of a particular multimedia item may include the terms 'coffee' and 'cup'. A search performed using the query 'java mug' may not match the multimedia item, even though 'java' can be synonymous with 'coffee', and 'cup' may be synonymous with 'mug'. If an IR system can detect that 'java' and 'mug' are synonyms for 'coffee' and 'cup' respectively, then the user would be returned the expected result. In this case, an expanded and improved query may be: (java OR coffee) AND (cup OR mug.)

One further challenge is that some terms should only be considered synonyms when they are used in a specific context. In the previous example, 'java' can indicate coffee, a programming language, an Indonesian island, etc. In order to properly expand the word 'Java' to the correct synonym of 'coffee', the context of the query must be examined. In this case, the word 'mug' in the query provides a clue that 'java' means a drink, and not a programming language or an island.

The disclosed implementations address these example challenges by considering the context of a query when deciding whether to expand a query to include synonyms. In some implementations, this may be accomplished by examining the keywords that are provided with a multimedia item. When multimedia items are included in a typical IR system they are given keywords so that they can be easily retrieved. In many IR systems, the keywords are provided by the contributor of the multimedia item. In other IR systems, the keywords are added after the multimedia item has been provided to the system by a contributor, potentially using crowdsourcing techniques. In still other IR systems, the keywords may be added in an automated fashion using algorithmic analysis of the multimedia item.

In many scenarios, contributors of multimedia items may include synonyms in the multimedia item's keywords in order to increase the chance of the item being retrieved. It is not uncommon for contributors to include as many synonyms as possible to their keywords to increase the chances that their content is retrieved. Besides the synonyms, contributors may include many other terms in the multimedia item's keywords that can indicate the context of the synonyms. That is, the other keywords included along with synonyms for a multimedia item can be mined to determine the context for the synonyms. When examining a large list of multimedia item keywords, this can be an effective way to extract synonym context. One additional advantage of this approach is that it does not require an ordering to the keywords; each word can be considered separately. Those skilled in the art may recognize this as a "bag-of-words" approach, as opposed to the sliding-window approach which is more common. A process for identifying synonyms, extracting synonym context, and using that information to expand a query is described below in accordance with some implementations.

Some aspects of the subject technology include storing information regarding information retrieval queries. A user has the option of preventing storage of such information. The user may also be provided with an opportunity to control whether programs or features collect or share such information. Thus, the user may have control over how information is collected about the computing device hardware and used by a server.

Figure 1:
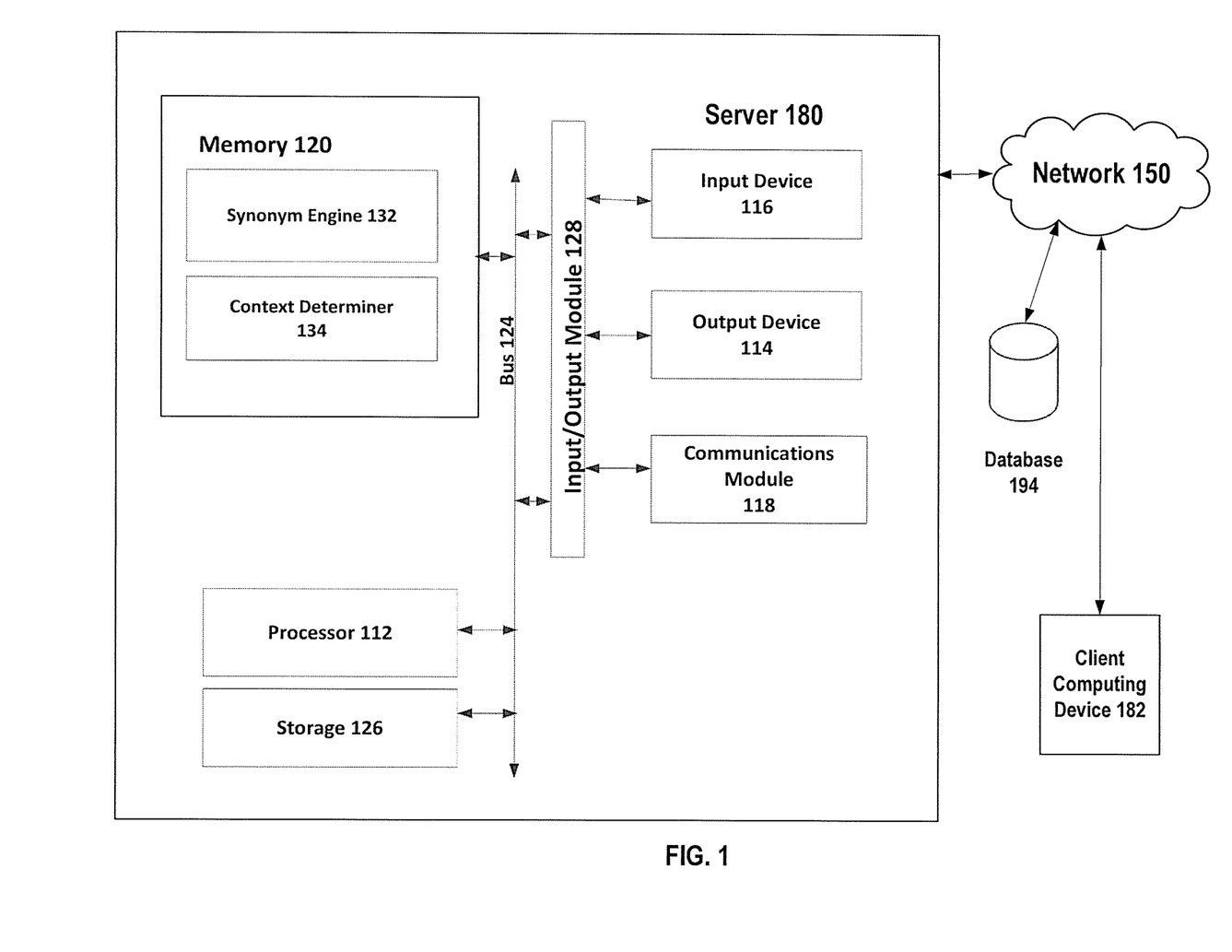
FIG. 1 is a diagram of an example device and network environment suitable for practicing some implementations of the subject technology.

FIG. 1 is a diagram illustrating example architecture for synonym expansion according to some implementations of the subject technology. Server 180 includes processor 112, memory 120, storage 126 and bus 124. Server 180 may also be associated with an input/output module, input device, output device and a communications module. Memory 120 includes synonym engine 132 and context determiner 134.

Server 180 may include one or more processors, memory and storage. Server 180 may additionally include an output device (e.g., touch screen display, non-touch screen display), input device (e.g., a keyboard, touchscreen, or mouse) to receive user input. In some implementations, computing device 190 may include one or more modules for facilitating user interaction with via a browser or a special purpose application executing on computing device 190. Server 180 may be implemented as a single machine with a single processor, a multi-processor machine, or a server farm including multiple machines with multiple processors. A communication module on server 180 can allow synonym engine 132 and context determiner 134 to send and receive data over network 150 to database 194 and client computing device 182. It is to be appreciated that computing device 182 may also include, but is not limited to one or more of the components included in server 180. For example, computing device 182 may also include a processor, memory, storage and bus. The computing device 182 may also be associated with an input/output module, input device, output device and a communications module. The memory of computing device 182 may also include one or more components communicating with synonym engine 132 and context determiner 134.

In some implementations, server 180 may be associated with database 194. Database 194 may store a plurality of multimedia items and any other content, including, but not limited to, images, video, audio or any combination thereof. Database 194 may also store data related to the synonym expansion and context determination. Database 194 may store one or more tables or any other type of data structure. For example, a data structure stored in database 194 may include two tables, one for the associated positive context for the candidate and one for the negative context terms. An example data structure is discussed further below with reference to FIG. 3.

In some implementations, server 180, database 194 and client computing device 182 can communicate with one another via a network 150. Network 150 may include the Internet, an intranet, a local area network, a wide area network, a wired network, a wireless network, or a virtual private network (VPN). While only one server 180, database 194 and client computing device 182 are illustrated, the subject technology may be implemented in conjunction with any number of servers 180, databases 194 and client computing devices 182. In some non-limiting implementations, a single computing device may implement the functions of certificate authority server 180, client computing device 182, database 194 and other components illustrated in FIG. 1.

Client computing device 182 can be a laptop computer, a desktop computer, a mobile phone, a personal digital assistant (PDA), a tablet computer, a netbook, a television with one or more processors embedded therein or coupled thereto, a physical machine, or a virtual machine. Client computing device 182 may each include one or more of a keyboard, a mouse, a display, or a touch screen. Client computing device 182 can include a web application configured to search and display content (e.g., multimedia items) retrieved from database 194. Alternatively, client computing device 182 may include special-purpose applications (e.g., mobile phone or tablet computer applications) for accessing content.

Potential Synonym Identification

In some implementations, synonym engine 132 can identify synonyms using one or more different approaches including, but not limited to, query rewrites and pointwise mutual information (PMI).

I. Query Rewrites

In some implementations, query traffic logs are examined by synonym engine 132 to find instances where a user performs a search using query terms "X" and the results produced may not lead the user to a success event (indicating poor results). For example, the user searches for 'old lamp' and does not obtain satisfying results.

In another example, a user subsequently modifies their original unsuccessful query by one word, and the new results lead the user to a success event or results perceived to be good by the user. The success event may be identified by synonym engine 132. For example, the user changes the original query 'old lamp' to 'antique lamp', and the new results are determined to be better. In this example, substituting one word, 'antique' for 'old', may have led the user to better results, so 'antique' and 'old' may be identified by synonym engine 132 as potential synonyms.

A success event in the process described above may vary between IR systems. In some systems, it can be defined as a download of a multimedia item or any other content. In other systems, it may be defined as a user clicking on the multimedia item and not clicking back in a short time frame (frequently called 'click-backs'). An amount of time between subsequent user queries, and the number of words that a user can vary a query by are thresholds that can be modified by synonym engine 132 in the process to provide good results. In the example above only one word substitutions may be considered by synonym engine 132, but multi-word substitutions can also be used.

The candidate list of potential synonyms identified above are ranked by synonym engine 132 by the frequency of occurrence within the user's data or across a plurality of users; the terms that were swapped out more often than others can be deemed by synonym engine 132 more likely to be synonyms than candidates that had fewer occurrences.

II. Pointwise Mutual Information

Another approach leveraged by synonym engine 132 for identifying synonym candidate pairs is to use the keywords provided with the multimedia items. A co-occurrence matrix may be constructed by synonym engine 132 for the top "X" most frequently occurring keywords in the multimedia collection, where the matrix is constructed such that entry (i, j) records the number of multimedia items in the collection that contain both terms indexed by row i and column j.

Pointwise Mutual Information (PMI) may then be computed by synonym engine 132 for each keyword pair in the matrix to determine the strength of the relationship between them. Pointwise mutual information (PMI), or point mutual information, is a well-known measure of association used in information theory and statistics. The PMI of a pair of outcomes x and y belonging to discrete random variables X and Y quantifies the discrepancy between the probability of their coincidence given their joint distribution and their individual distributions, assuming independence. Mathematically:

$$pmi(x; y) \equiv \log\frac{p(x, y)}{p(x)p(y)} = \log\frac{p(x|y)}{p(x)} = \log\frac{p(y|x)}{p(y)}.$$

The mutual information (MI) of the random variables X and Y is the expected value of the PMI over all possible outcomes (with respect to the joint distribution p (x,y)).

As an example, a particular pair may only be considered by synonym engine 132 if some set of threshold conditions is met, where the threshold conditions are picked to avoid identifying spurious relationships that may arise from insufficient evidence in the data. One typical example condition might be that each term must occur with some minimum absolute count in the collection. Another condition may require that the co-occurrence count of the pair meet some minimum threshold. The pairs are then ranked by synonym engine 132 based on their PMI value, and only the terms that meet threshold Z are considered by synonym engine 132. The keyword pairs that are above threshold Z may be identified as potential synonyms by synonym engine 132.

Filtering Potential Synonyms

Some of the potential synonyms identified by synonym engine 132 in the processes above may not be true synonyms and may include false positives. The keyword terms with high PMI values and high occurrences of query rewriting can indicate a high probability that the terms are good synonyms, but the other terms require additional filtering. To help filter out these false positives, synonym engine 132 can manually curate the potential synonym list, potentially leveraging crowdsourcing.

In some other implementations, synonym engine 132 can leverage a feedback loop that incorporates observed patterns in user traffic. The list of potential synonyms can be included in query expansion and their performance carefully tracked by synonym engine 132. Should the candidates indicate poor query results, as measured by synonym engine 132 by a lack of success events or poor engagement metrics, then the term can be automatically filtered by synonym engine 132 from the list of synonyms.

Determining Synonym Context

In some example cases, many of the synonyms identified by synonym engine 132 may only be valid within a certain query context. For example, if 'cup' and 'mug' are identified as possible synonyms by synonym engine 132, then expanding 'coffee cup' to 'coffee AND (cup OR mug)' would yield expected results and the context of "coffee" is a positive indicator that the expansion is a valid one. On the other hand, if the context is "soccer world", as in the query 'soccer world cup', then expanding the query to 'soccer AND world AND (cup OR mug)' would not yield expected results and the context 'soccer world" is a negative indicator for the expansion of cup to "cup OR mug". As these examples illustrate, it is important to identify the context of the synonym so that a query is not incorrectly expanded.

In some implementations, the context for expanding a query term can be determined by context determiner 134 by the other terms in the query. At run time, the context is used by synonym engine 132 to evaluate the usefulness of expanding query terms to include potential candidate synonyms. In order to decrease the time needed to evaluate a possible expansion within a given context, for each candidate synonym expansion a closed set of possible context terms is pre-computed and scored by context determiner 134. Each candidate synonym expansion, e.g. "cup"→"cup OR mug", is associated by context determiner 134 with two tables: a table of positive context terms and a table of negative context terms. Each table associates each context term with a score indicating the degree to which a contextual term indicates the viability of the expansion. These are used in subsequent candidate scoring by context determiner 134 as described below.

One method for the extraction and computation of contextual term scores by context determiner 134 in accordance with some implementations is now described. The context for synonyms is identified by context determiner 134 examining the keywords that have high correlation with the identified synonym candidate pair. It may not be unusual for users that upload multimedia items to an IR system to provide keywords for the multimedia items, and many synonymous keywords are provided in an attempt to increase the chances of the multimedia item being retrieved by a user query. As a result, many potential synonyms as well as supporting context terms can be found by context determiner 134 in the keywords or tags, as well as image description and any other textual metadata provided with a multimedia item.

Figure 2:
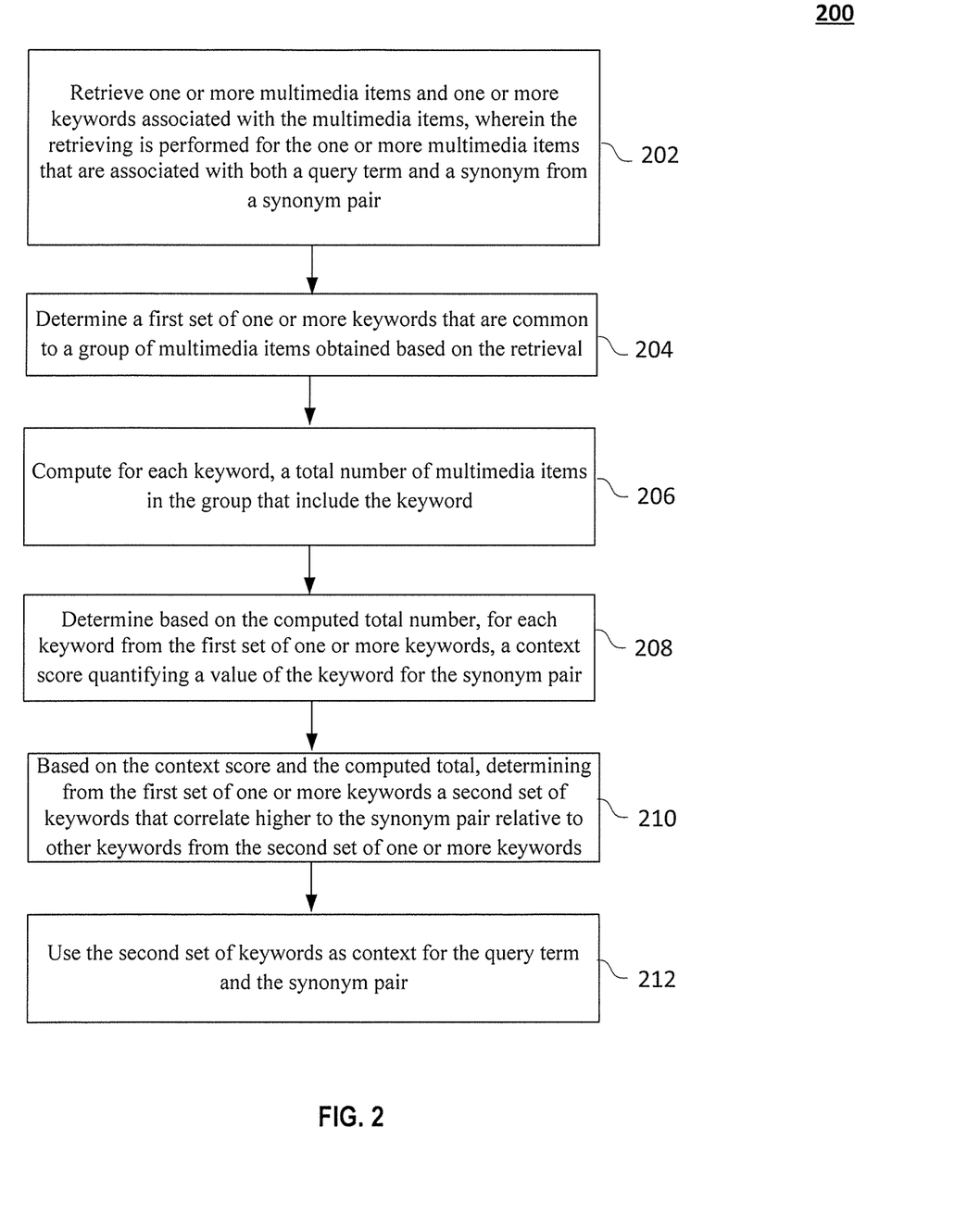
FIG. 2 illustrates an example process for practicing implementations of the subject technology using the example device of FIG. 1.

FIG. 2 is a flowchart illustrating an example operation of context determiner 134 in accordance with some implementations.

Process 200 begins with retrieving one or more multimedia items and one or more keywords associated with the multimedia items, where the retrieving is performed for the one or more multimedia items that are associated with both a query term and a synonym from a synonym pair (stage 202). As an example, the retrieving by context determiner 134 can include retrieval of all the multimedia items and their keywords for all the multimedia items that have both the original query term and the candidate synonym in the item's list of keywords.

Process 200 proceeds by determining a first set of one or more keywords that are common to a group of multimedia items obtained based on the retrieving (stage 204). As an example, context determiner 134 determines the set of keywords that appear in the largest number of items obtained in stage 202. For each such keyword, the total count is, for example, referred to as count_synonym.

Process 200 computes for each keyword, a total number of multimedia items in the group that include the keyword (stage 206). For example, for each keyword identified in stage 202, the total number of multimedia items in the collection containing that word is computed by context determiner 134. This count is, for example, referred to as count_total_freq.

Based on the computed total number, for each keyword from the first set of one or more keywords, a context score quantifying a value of the keyword for the synonym pair is determined (stage 208). As an illustrative example, for each keyword identified in stage 204, a context score that judges the value of the context keyword for the synonym pair is computed by context determiner 134. The score may be computed in a manner similar to tf-idf (term frequency-inverse document frequency) and may be represented as: context score=count_synonym*log (total collection size/count_total_freq). The score can reflect the fact that a good context term may appear in the majority of documents where the synonym pair appears while also not appearing overly frequently in the collection in general.

Based on the context score and the computed total, from the first set of one or more keywords a second set of keywords is determined that correlates higher to the synonym pair relative to other keywords from the second set of one or more keywords (stage 210). As an example context determiner 134 may remove any context keywords that do meet some minimum context score threshold score. As an example, the remaining keywords indicate keywords that highly correlate to the synonyms, and hence can be considered their context. Scores are indicators of relative strength of context suitability. Process 200 may then proceed by using the second set of keywords as context for the query term and the synonym pair (stage 212).

As an example, if context determiner 134 seeks to find positive context terms to support making an expansion from cup to mug, in stage 202 above context determiner 134 can extract all multimedia items from the collection that contain both the terms "cup" and "mug" as keywords.

In stage 204, context determiner may consider all of the other keywords that appear in this restricted set of multimedia items and find the keywords most frequently appearing. For example, in this case we may find that "latte" appears in 3000 documents while "championship" appears in only 5.

In stage 206, context determiner 134 may take the common terms from stage 204 such as "latte" and find its frequency in the total collection, e.g. it may appear in 10,000 documents. In stage 208, context determiner 134 may calculate the score for the context term "latte' as 3000*log(10,000,000/10,000), assuming there are 10,000,000 total documents in the collection. In stage 210, for example, context determiner 134 may compare this score to a threshold, e.g. a minimum context score of 100, to decide whether or not to keep the context term. This example is purely illustrative and is not intended to limit the disclosed implementations.

Determining when to Expand a Query

In some implementations, to utilize the synonym candidate pairs identified above in an IR system, synonym engine 132 may create a data structure whose keys are a query term that could potentially be expanded into one or more synonyms. Given an original query term, the data structure would return to synonym engine 132 a list of potential synonym candidates and a data structure associated with each candidate.

Figure 3:
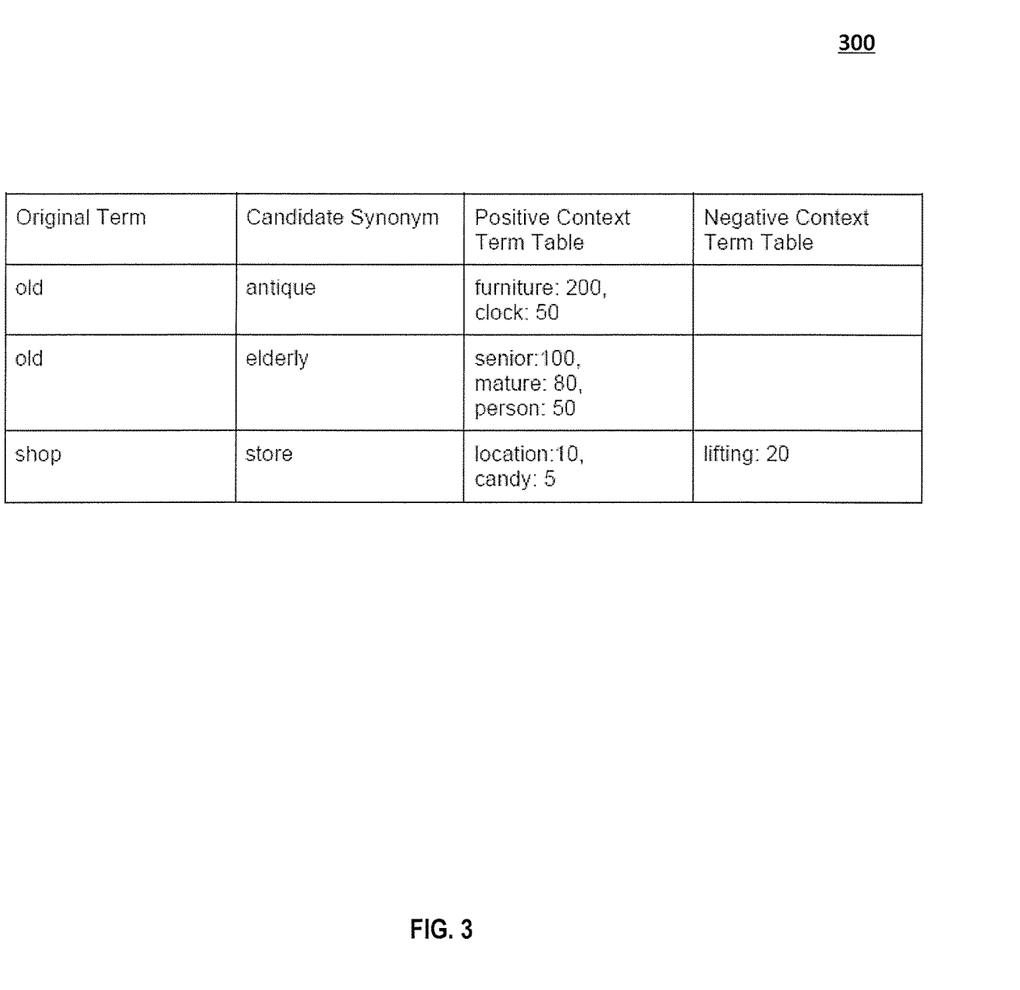
FIG. 3 illustrates an example data structure in accordance with some implementations.

An example data structure 300 is illustrated in FIG. 3. In some implementations, data structure 300 may be stored at database 194. In other implementations, data structure 300 may be stored in memory 120 at server 180. Data structure 300 includes two tables, one for the associated positive context terms (e.g., "furniture," "clock") for the candidate and one for the negative context terms (e.g., "lifting"). Each table consists of a single context term and an associated score (e.g., 200, 50) indicating how important the context term is when scoring the validity of the possible expansion from the original query term to the given candidate. The scores are determined in the previous step.

Figure 4:
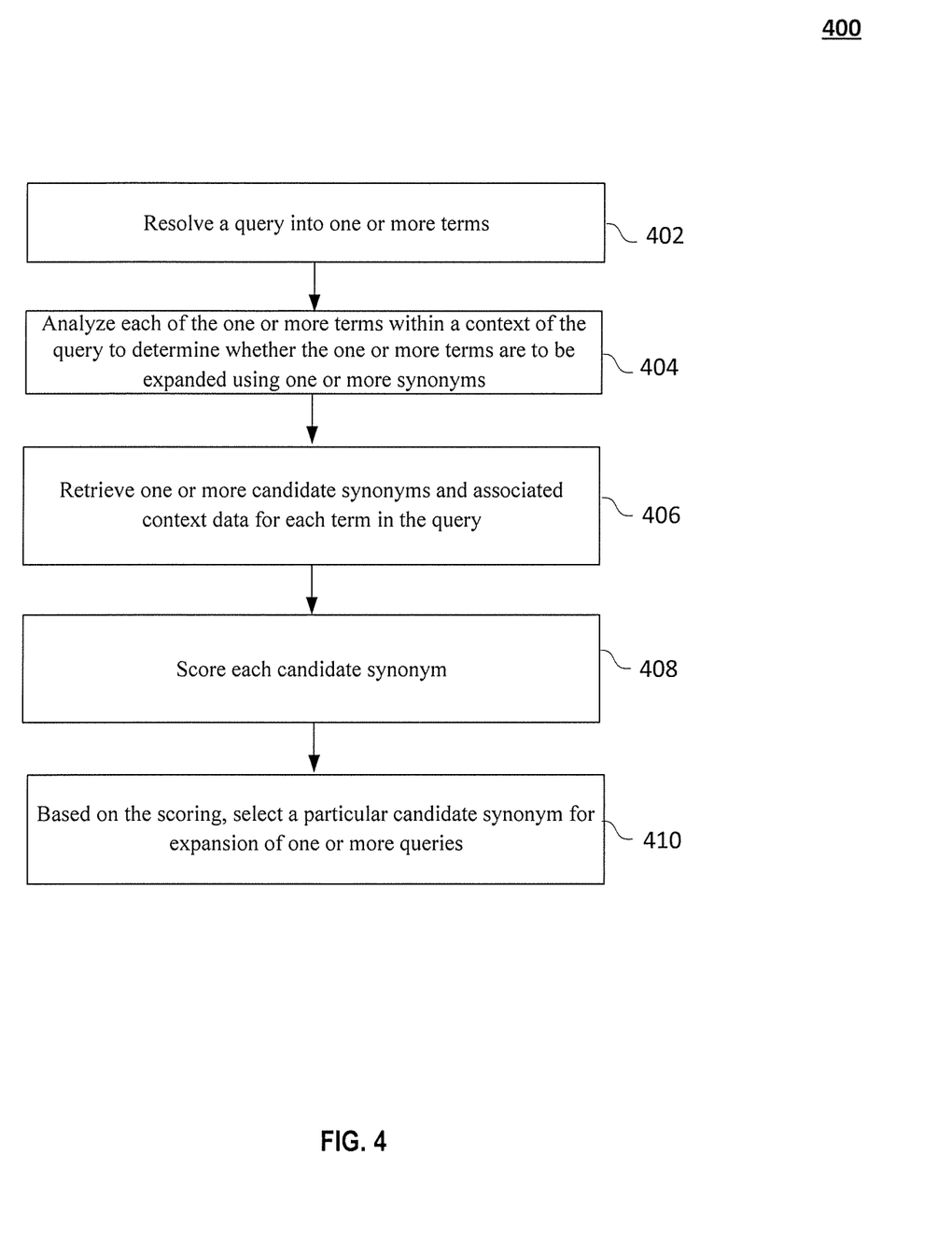
FIG. 4 illustrates another example process for practicing implementations of the subject technology using the example device of FIG. 1.

Process 400 is an example process in accordance with some implementations that enables determination of whether there is sufficient contextual evidence to include a candidate expansion, and if so, which is the best candidate among all potential candidates for a term.

Process 400 begins with resolving a query into one or more terms (stage 402). As an example when a user performs a query the query may be split into individual terms by synonym engine 132.

Process 400 proceeds by analyzing each of the one or more terms within a context of the query to determine whether the one or more terms are to be expanded using one or more synonyms (stage 404). As an example, for the query "A B C", when considering candidate synonyms for query term A, the context would include "B" and "C". Each query term is considered independently for expansion.

One or more candidate synonyms and associated context data for each term in the query are retrieved (stage 406). Referring to the example of stage 404, "A" would be considered for expansion with the context of "B" and "C", and all candidate synonyms for "A" would be retrieved along with the scores for the context terms "B" and "C" for each candidate.

Each candidate synonym is scored (e.g., stage 408). As an example, each candidate synonym is then scored by synonym engine 134 and the highest scoring candidate synonym is chosen. If that candidate has a score that exceeds some threshold, then it may be included for expansion by synonym engine 132. Based on the scoring, a particular candidate synonym for expansion of the query is selected (stage 410).

As an example, if the user inputs the query "coffee cup", in stage 402 the query may be split by synonym engine 132 into "coffee" and "cup". Each term is then independently analyzed by synonym engine 132 to try and expand with synonyms, so in stage 404 the word "cup" would be analyzed in the context of the term "coffee" and later the term "coffee" would be analyzed in the context of "cup". In stage 406, for the case of "cup", candidate synonyms might include "mug" or "championship". Stage 408 would then score the candidate synonyms "mug" and "championship" in the context of "coffee" to determine which is the best candidate and if the score is sufficiently high, expand the term "cup" to either "cup OR mug" or to "cup OR championship".

In some implementations, for each context term in the query, if a matching positive or negative context term is found in the precomputed data structure (e.g., data structure 300) for the candidate synonym, the score is added (positive context) or subtracted (negative context). In another implementation, context terms may be treated as Boolean indicators. If, for example, any of the other context terms in the query are found in the candidate synonym's negative context term list, the candidate is dropped from consideration as a possible expansion.

The score for a given candidate can also be used by synonym engine 132 to help weight the expanded term in the rewritten query. If a synonym is weakly scored by synonym engine 132, it could potentially be weighted less in the query. For example if "cup" is expanded to "cup OR mug", mug may receive a lower weight than cup when the IR system scores matching multimedia items. One such way for synonym engine 132 to indicate this to an IR system may be "coffee AND (cup OR mug^0.5), where 0.5 indicates that mug is less important than the original term "cup". Once the query has been expanded with a synonym by synonym engine 132, the query may then return results for the user. The query can be typically further processed and the search engine uses it to score documents and then return results to the user.

Returning to FIG. 1, in certain aspects, server 180 or client computing device 182 may be implemented using hardware or a combination of software and hardware, either in a dedicated server, computing device or integrated into another entity, or distributed across multiple entities.

Server 180 includes a bus 124 or other communication mechanism for communicating information, and processor 112 coupled with bus 124 for processing information. Processor 112 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Server 180 can include, in addition to hardware, code that creates an execution environment for the computer program in question, e.g., code that constitutes processor firmware, a protocol stack, a database management system, an operating system, or a combination of one or more of them stored in memory 120. Memory 120 may include Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 124 for storing information and instructions to be executed by processor 112. The processor 112 and the memory 120 can be supplemented by, or incorporated in, special purpose logic circuitry.

The instructions may be stored in the memory 120 and implemented in one or more computer program products, i.e., one or more modules of computer program instructions encoded on a computer readable medium for execution by, or to control the operation of, synonym engine 132 or context determiner 134, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, datastructured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 120 may also be used for storing temporary variable or other intermediate information during execution of instructions to be executed by processor 112.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Server 180 further includes a data storage device 126 such as a magnetic disk or optical disk, solid state memory, non-volatile memory, etc. coupled to bus 124 for storing information and instructions. Server 180 may be coupled via an input/output module to various devices. The input/output module can be any input/output module. Example input/output modules include data ports such as USB ports. The input/output module can be configured to connect to a communications module. Example communications modules include networking interface cards, such as Ethernet cards and modems. In certain aspects, the input/output module is configured to connect to a plurality of devices, such as an input device and/or an output device. Example input devices include a keyboard and a pointing device, e.g., a mouse or a trackball, by which a user can provide input to the client computing device 182 and server 180. Other kinds of input devices can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices include display devices, such as a LED (light emitting diode), CRT (cathode ray tube), or LCD (liquid crystal display) screen, for displaying information to the user.

According to one aspect of the present disclosure, synonym engine 132 or context determiner 134 can be implemented in client computing device 190 in response to processor 112 executing one or more sequences of one or more instructions contained in memory 120. Such instructions may be read into memory 120 from another machine-readable medium, such as storage device 126. Execution of the sequences of instructions contained in main memory 120 causes processor 112 to perform the process blocks described herein. One or more processors in a multi-processing arrangement may also be employed to execute the sequences of instructions contained in memory 120. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Client computing device 182 can be, for example, and without limitation, a desktop computer, laptop computer, or tablet computer. Client computing device 182 may provide a graphical user interface that allows a user to provide queries to server 180. Client computing device 182 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 112 for execution. Such a medium may take many forms, including, but not limited to, non-volatile media and volatile media. Non-volatile media include, for example, optical disks, magnetic disks, or flash memory, such as data storage device 126. Volatile media include dynamic memory, such as memory 120. Transmission media include coaxial cables, copper wire, and fiber optics, including the wires that comprise bus 124. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate aspects can also be implemented in combination in a single aspect. Conversely, various features that are described in the context of a single aspects can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer implemented method comprising:
    receiving, through a user interface, a query for one or more multimedia items from a collection of multimedia items;
    retrieving one or more multimedia items from the collection of multimedia items, and one or more keywords associated with the multimedia items, wherein the retrieving is performed for the one or more multimedia items that are associated with both a query term of the query and a synonym from a synonym pair;
    determining a first set of one or more keywords that are common to a group of multimedia items obtained based on the retrieving;
    computing for each keyword, a total number of multimedia items in the group that include the respective keyword;
    determining a context score quantifying a value of each keyword from the first set of one or more keywords for the synonym pair;
    determining from the first set of one or more keywords a second set of keywords by comparing the context score to a predetermined threshold context score, the second set of keywords identified based on success events, the success events comprising successful previous word substitutions for a user or a plurality of users;
    selecting the second set of keywords as context terms for the query term and the synonym pair;
    rewriting the query term as a rewritten query term based on the selected second set of keywords, the rewritten query term weighted according to the context score; and
    returning, through the user interface, results comprising one or more multimedia items from the collection of multimedia items based on the rewritten query term.

2. The method of claim 1, wherein the group represents a majority of multimedia items.

3. The method of claim 1, wherein the value is indicative that the keyword appears in a majority or a fraction of the one or more multimedia items where the synonym pair also appears.

4. The method of claim 1, further comprising removing, based on the comparing, at least one keyword from the first set of one or more keywords to create the second set of one or more keywords.

5. The method of claim 1, wherein the query term is received from a user intending to retrieve a particular multimedia item from the one or more multimedia items.

6. The method of claim 5, wherein the context score is pre-computed for each keyword from the first set of one or more keywords prior to receiving the query term.

7. A system comprising:
    a memory comprising instructions; and
    a processor configured to execute the instructions to:
    receive, through a user interface, a query for one or more multimedia items from a collection of multimedia items;
    retrieve one or more multimedia items from the collection of multimedia items, and one or more keywords associated with the multimedia items, wherein the retrieving is performed for the one or more multimedia items that are associated with both a query term of the query and a synonym from a synonym pair;
    determine a first set of one or more keywords that are common to a group of multimedia items obtained based on the retrieving;
    compute for each keyword, a total number of multimedia items in the group that include the respective keyword;
    determine a context score quantifying a value of each keyword from the first set of one or more keywords for the synonym pair;
    determine from the first set of one or more keywords a second set of keywords by comparing the context score to a predetermined threshold context score, the second set of keywords identified based on success events, the success events comprising successful previous word substitutions for a user or a plurality of users;
    select the second set of keywords as context terms for the query term and the synonym pair;
    rewrite the query term as a rewritten query term based on the selected second set of keywords, the rewritten query term weighted according to the context score; and
    return, through the user interface, results comprising one or more multimedia items from the collection of multimedia items based on the rewritten query term.

8. The system of claim 7, wherein the group represents a majority of multimedia items.

9. The system of claim 7, wherein the value is indicative that the keyword appears in a majority of the one or more multimedia items where the synonym pair also appears.

10. The system of claim 7, further comprising instructions to remove, based on the comparing, at least one keyword from the first set of one or more keywords to create the second set of one or more keywords.

11. The system of claim 7, wherein the query term is received from a user intending to retrieve a particular multimedia item from the one or more multimedia items.

12. A machine-readable medium comprising instructions stored therein, which when executed by a processor, causes the processor to perform operations comprising:

receiving, through a user interface, a query for one or more multimedia items from a collection of multimedia items;

retrieving one or more multimedia items from the collection of multimedia items, and one or more keywords associated with the multimedia items, wherein the retrieving is performed for the one or more multimedia items that are associated with both a query term of the query and a synonym from a synonym pair;

determining a first set of one or more keywords that are common to a group of multimedia items obtained based on the retrieving;

computing for each keyword, a total number of multimedia items in the group that include the respective keyword;

determining a context score quantifying a value of each keyword from the first set of one or more keywords for the synonym pair;

based on the context score and the computed total;

determining from the first set of one or more keywords a second set of keywords the second set of keywords identified based on success events, the success events comprising successful previous word substitutions for a user or a plurality of users;

selecting the second set of keywords as context terms for the query term and the synonym pair;

rewriting the query term as a rewritten query term based on the selected second set of keywords, the rewritten query term weighted according to the context score; and returning, through the user interface, results comprising one or more multimedia items from the collection of multimedia items based on the rewritten query term.

* * * * *